United States Patent
Cho et al.

(10) Patent No.: US 8,594,887 B1
(45) Date of Patent: Nov. 26, 2013

(54) METHOD AND SYSTEM FOR MEASURING TILT ANGLE DURING TURN OF VEHICLE

(71) Applicants: Hyundai Motor Company, Seoul (KR); Kia Motors Corporation, Seoul (KR)

(72) Inventors: Jinkuk Cho, Gyeonggi-do (KR); Yong Kak Choi, Seoul (KR); Il Kwon Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/717,278

(22) Filed: Dec. 17, 2012

(30) Foreign Application Priority Data

Oct. 26, 2012 (KR) ......................... 10-2012-0119991

(51) Int. Cl.
*G06F 7/00* (2006.01)
(52) U.S. Cl.
USPC .......................................................... 701/36
(58) Field of Classification Search
None
See application file for complete search history.

(56) References Cited

U.S. PATENT DOCUMENTS

| | | | | |
|---|---|---|---|---|
| 7,822,575 | B2 * | 10/2010 | Suzuki et al. | 702/151 |
| 2009/0024350 | A1 * | 1/2009 | Suzuki et al. | 702/141 |
| 2013/0041561 | A1 * | 2/2013 | Asami et al. | 701/50 |

FOREIGN PATENT DOCUMENTS

| | | |
|---|---|---|
| JP | 07083659 A | 3/1995 |
| JP | 2000065563 A | 3/2000 |
| KR | 10-2000-0031712 | 6/2000 |
| KR | 10-2004-0005146 | 1/2004 |
| KR | 10-0792908 | 1/2008 |
| KR | 10-2008-0050048 | 6/2008 |
| KR | 10-2011-0109606 | 10/2011 |

\* cited by examiner

*Primary Examiner* — Thomas Tarcza
*Assistant Examiner* — Adam Alharbi
(74) *Attorney, Agent, or Firm* — Edwards Wildman Palmer LLP; Peter F. Corless (57) ABSTRACT

Disclosed herein is a method and system for measuring a tilt angle while a vehicle is turning according to a lateral acceleration and a yaw rate occurring while a vehicle is turning, the method including calculating, by a controller, a traveling acceleration based on a vehicle speed detected by a vehicle speed sensor; detecting a longitudinal acceleration of a vehicle by a longitudinal acceleration sensor; calculating a first tilt angle of the road based on the traveling acceleration and the longitudinal acceleration; detecting a yaw rate of the vehicle by a yaw rate sensor; determining when a value of the detected yaw rate is equal to or greater than a predetermined value; and calculating a second tilt angle to apply a compensation value to the first tilt angle in response to detecting the yaw rate equal to or greater than a predetermined value.

15 Claims, 5 Drawing Sheets

FIG. 1

Prior Art

METHOD AND SYSTEM FOR MEASURING TILT ANGLE DURING TURN OF VEHICLE

CROSS-REFERENCE TO RELATED APPLICATION

This application claims priority to and the benefit of Korean Patent Application No. 10-2012-0119991 filed in the Korean Intellectual Property Office on Oct. 26, 2012, the entire contents of which are incorporated herein by reference.

BACKGROUND OF THE INVENTION (a) Field of the Invention

The present invention relates to a method and system for measuring a tilt angle that measure a tilt angle according to a lateral acceleration and a yaw rate while the vehicle is turning.

(b) Description of the Related Art

In general, a vehicle travels on an inclined traveling road at a tilted angle and the tilt angle may be used for various purposes. For example, to improve fuel consumption and determine a change in a speed pattern of the vehicle, a tilt angle of a road may be used. Further, a tilt angle may be used to prevent the vehicle from slipping backward upon starting. Furthermore, the tilt angle may be used for determination of a traveling path of a navigation device, a position control of the vehicle, fuel consumption improvement of the vehicle, and detection of real time energy consumption of the vehicle.

The tilt angle may be measured by various methods such as use of an atmospheric pressure sensor, an acceleration sensor, an electronic compass, or a gyro sensor, but an acceleration sensor is widely used.

Most acceleration sensors are a longitudinal acceleration sensor that measures longitudinal acceleration. The longitudinal acceleration sensor generally uses a piezoelectric sensor. The longitudinal acceleration sensor using a piezoelectric sensor has a long bar form, and when the piezoelectric sensor of the long bar form is bent by an acceleration force, the piezoelectric sensor outputs a voltage corresponding thereto. The voltage represents corresponding acceleration. Hereinafter, unless stated otherwise, an acceleration sensor indicates longitudinal acceleration.

Figure 1:
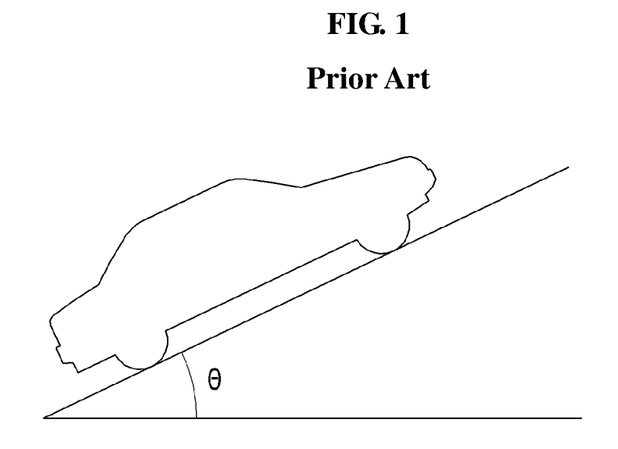
FIG. 1 is a diagram illustrating a general method of measuring a tilt angle.

An example of calculating a tilt angle using the acceleration sensor will be described with reference to FIG. 1.

An output signal value (long_accel_val) of the acceleration sensor and a tilt angle ($\theta$) corresponding to the output signal value may be calculated by the following Equation 1.

$$Ma = F - (F_{aerodynamic} + F_{Rolling} + F_{Climbing})$$

$$Ma = F - (F_{aerodynamic} + F_{Rolling} + Mg\sin\theta)$$

$$F - (F_{aerodynamic} + F_{Rolling}) = M \cdot (a + g\sin\theta)$$

$$\text{long\_accel\_val} = a + g\sin\theta$$

$$g\sin\theta = \text{long\_accel\_val} - a$$

$$\sin\theta \cong \theta = \frac{1}{g}(\text{long\_accel\_val} - a)$$

$$\therefore \theta = \frac{1}{g}(\text{long\_accel\_val} - a)$$

Wherein, M is a vehicle mass, a is a traveling acceleration of a vehicle, g is a gravity acceleration, F is an output of the vehicle, $F_{aerodynamic}$ is air resistance of the vehicle, $F_{rolling}$ is rolling resistance of the vehicle, and $F_{climbing}$ is tilt resistance of the vehicle.

For example, a traveling acceleration (a) of the vehicle may be obtained by differentiating an output value of a vehicle speed sensor that detects a vehicle speed. To obtain traveling acceleration of the vehicle by differentiating an output value of the vehicle speed sensor is well known to a person of a common skill in the art and therefore a detailed description thereof will be omitted.

When an output value (long_accel_val) and the traveling acceleration (a) of the acceleration sensor are known, a tilt angle ($\theta$) is calculated by Equation 1 above. In Equation 1, when there is no difference between the output value (long_accel_val) of the acceleration sensor and the traveling acceleration (a), it may be determined that the tilt angle is 0 and the road is substantially level.

However, when measuring a tilt angle using the acceleration sensor as described above while the vehicle is turning, a lateral acceleration and/or a yaw rate corresponding to turn of the vehicle may occur and thus there may be a difference between an output value of an actual acceleration sensor and an actual acceleration value and thus an accurate tilt angle may not measured. When there is a difference between the actual acceleration and an output of an acceleration sensor by an influence of lateral acceleration and a yaw rate occurring during turn of the vehicle, the measured tilt angle may decrease.

Figure 2:
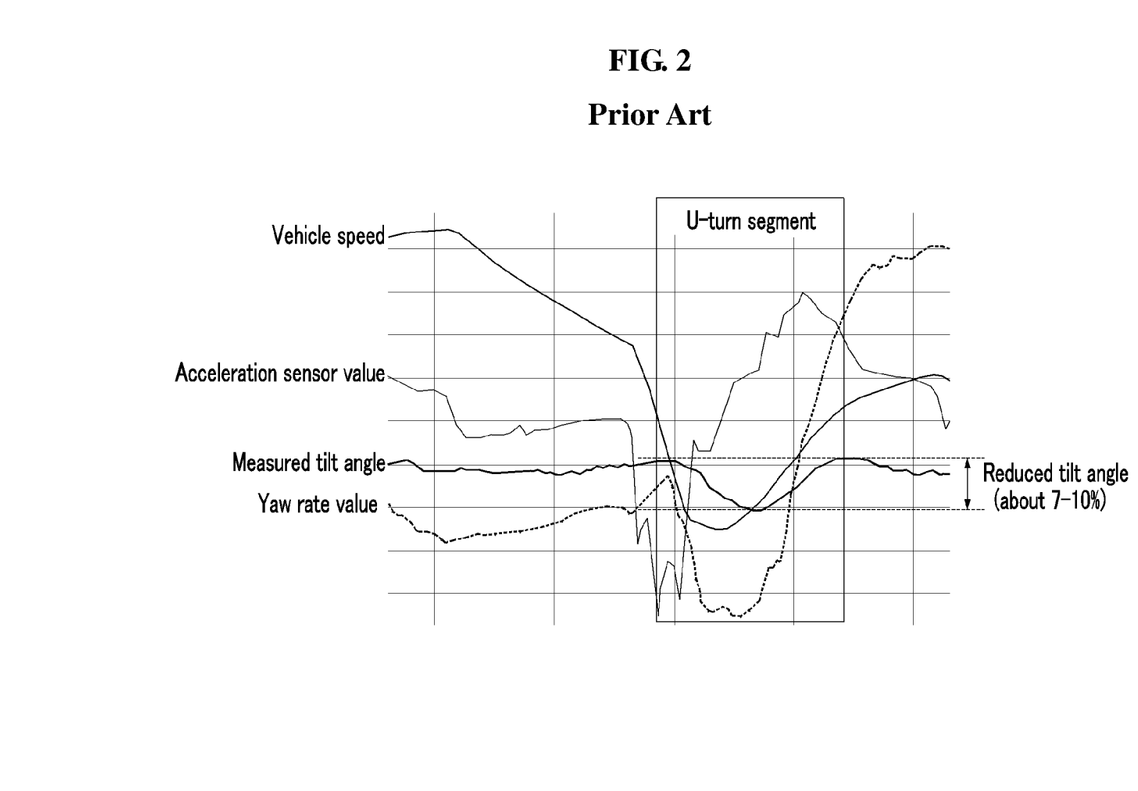
FIG. 2 is a diagram explaining a problem of a conventional method of measuring a tilt angle.

FIG. 2 is an exemplary graph illustrating a situation in which a vehicle performs a U-turn while the vehicle brakes on a level road. Referring to FIG. 2, when the vehicle performs a U-turn, as the lateral acceleration and the yaw rate occur corresponding to turn, a measured tilt angle may reduce by about 7-10%. When the tile angle reduces, a control device of a vehicle using a tilt angle may erroneously recognize the road as a level road and thus erroneously control the vehicle.

The above information disclosed in this section is only for enhancement of understanding of the background of the invention and therefore it may contain information that does not form the prior art that is already known in this country to a person of ordinary skill in the art.

SUMMARY

The present invention has been made in an effort to provide a method and system for measuring a tilt angle having advantages of measuring a tilt angle according to a lateral acceleration and/or a yaw rate occurring while the vehicle is turning.

An exemplary embodiment of the present invention provides a method of measuring a tilt angle of a traveling road, the method including: calculating a traveling acceleration based on a vehicle speed detected through a vehicle speed sensor; detecting a longitudinal acceleration of a vehicle through a longitudinal acceleration sensor; calculating a first tilt angle of the traveling road based on the traveling acceleration and the longitudinal acceleration; detecting a yaw rate of the vehicle through a yaw rate sensor; determining when a value of the detected yaw rate is equal to or greater than a predetermined value; and obtaining, when a value of the detected yaw rate is equal to or greater than a predetermined value, a second tilt angle that applies a compensation value that is set to the first tilt angle.

When a value of the detected yaw rate is less than a predetermined value, the first tilt angle may be set as the second tilt angle. The predetermined compensation value may be set to be proportional to a value of the yaw rate. The obtaining of an applied tilt angle may include applying by adding the predetermined compensation value to the first tilt angle.

The traveling acceleration may be calculated by differentiating the travel speed by a predetermined time, and the first tilt angle may be calculated based on a value that subtracts the traveling acceleration from the longitudinal acceleration.

Another embodiment of the present invention provides a system that measures a tilt angle of a traveling road, the system including: a vehicle speed sensor that detects a vehicle speed; a longitudinal acceleration sensor that detects longitudinal acceleration of a vehicle; a yaw rate sensor that detects a yaw rate of the vehicle; and a tilt angle measurement device that receives an input of a signal of the vehicle speed sensor, the longitudinal acceleration sensor, and the yaw rate sensor and that measures a tilt angle of the traveling road, wherein the tilt angle measurement device operates by a predetermined program including a series of commands for executing a method of measuring a tilt angle according to the foregoing exemplary embodiment of the present invention.

The tilt angle measuring device may include a plurality of units controlled by a controller. The plurality of units may include a vehicle speed input unit that receives an input of a signal of the vehicle speed sensor; a longitudinal acceleration input unit that receives an input of a signal of the longitudinal acceleration sensor; a first tilt angle calculation unit that calculates traveling acceleration based on the vehicle speed and that calculates a first tilt angle based on the calculated traveling acceleration and the longitudinal acceleration; a yaw rate input unit that receives an input of a signal of the yaw rate sensor; a yaw rate magnitude determination unit that determines when a magnitude of a signal of the yaw rate sensor is equal to or greater than a predetermined value; a compensation value calculation unit that calculates a compensation value for compensating the first tilt angle according to the yaw rate magnitude; and a compensation value coupling unit that outputs a second tilt angle by adding the first tilt angle and the compensation value.

As described above, according to an exemplary embodiment of the present invention, in consideration of lateral acceleration and a yaw rate occurring the vehicle is turning, a tilt angle may be accurately measured.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules/units and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 3:
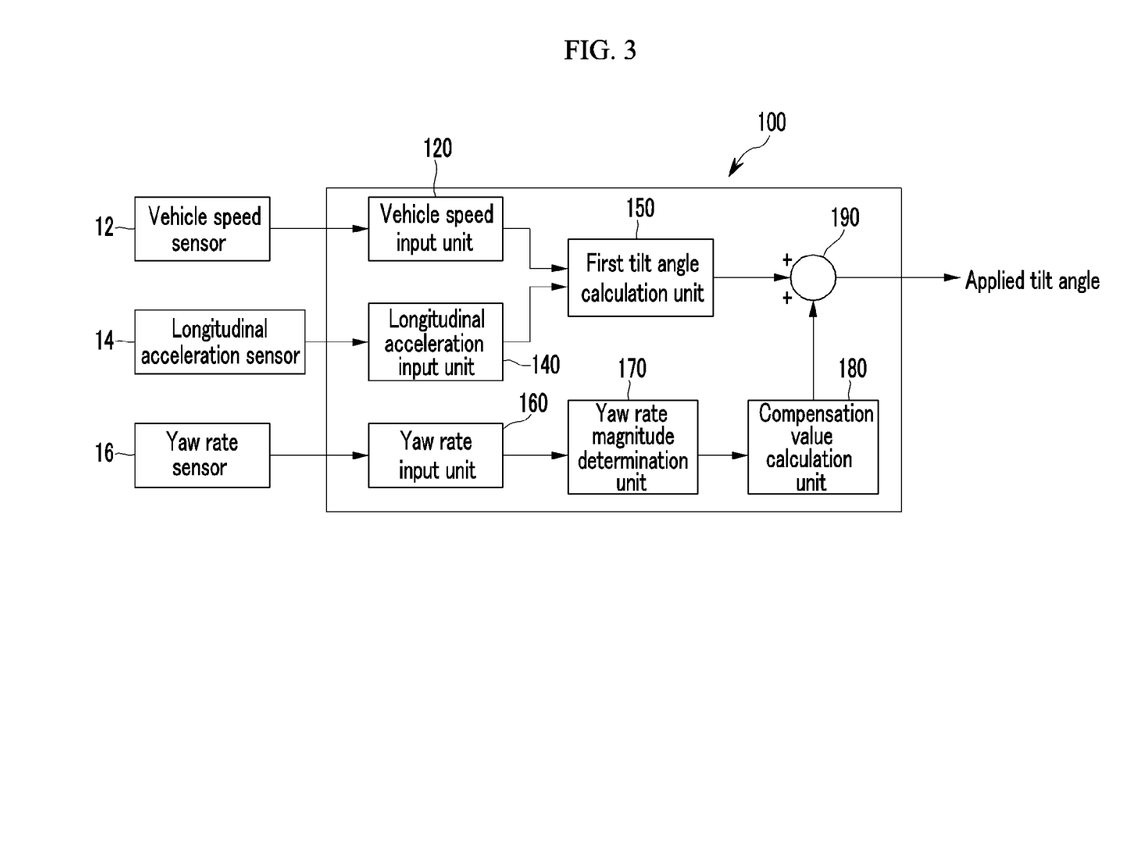
FIG. 3 is a block diagram illustrating a configuration of a tilt angle measuring system according to an exemplary embodiment of the present invention.

FIG. 3 is an exemplary block diagram illustrating a configuration of a tilt angle measuring system, according to an exemplary embodiment of the present invention.

The tilt angle measuring system according to an exemplary embodiment of the present invention is a tilt angle measuring system that accurately measures a tilt angle according to a yaw rate and/or a lateral acceleration occurring while the vehicle is turning. The system may include a vehicle speed sensor 12 configured to detect a vehicle speed; a longitudinal acceleration sensor 14 configured to detect longitudinal acceleration of the vehicle; a yaw rate sensor 16 configured to detect a yaw rate of the vehicle; and a tilt angle measuring device 100, controlled by a controller, configured to receive an input of a signal of the vehicle speed sensor 12, the longitudinal acceleration sensor 14, and the yaw rate sensor 16 to measure a tilt angle of the traveling road.

The tilt angle measuring device 100 may operate by a predetermined program including a series of commands for performing a method of measuring a tilt angle according to an exemplary embodiment of the present invention.

The vehicle speed sensor 12 may be, for example, a sensor attached to a wheel to detect a rotation speed of the wheel, but it should be understood that the present invention is not limited thereto. When the vehicle speed sensor 12 has a configuration that may output a signal corresponding to a substantial vehicle speed, the vehicle speed sensor 12 may be within the scope of the present invention.

The longitudinal acceleration sensor 14 may be a sensor that is conventionally applied to the vehicle to detect a longitudinal acceleration of the vehicle. The yaw rate sensor 16 may be a sensor that is conventionally applied to the vehicle and that detects a yaw rate of the vehicle during turn of the vehicle.

The tilt angle measuring device 100, controlled by the controller, may include hardware that may include at least one processor or microprocessor and electronic parts operating by a predetermined program, and the predetermined program may be formed with a series commands for executing a method of measuring a tilt angle according to an exemplary embodiment of the present invention to be described later. In other words, the tilt angle measuring device 100 may include a plurality of modules in which a program and hardware are combined.

Furthermore, as shown in FIG. 3, the tilt angle measuring device 100 that is formed with a plurality of modules in which a program and hardware are coupled may include a vehicle speed input unit 120 configured to receive an input of a signal of the vehicle speed sensor 12; a longitudinal acceleration input unit 140 configured to receive an input of a signal of the longitudinal acceleration sensor 14; and a first tilt angle calculation unit 150 configured to calculate a traveling acceleration based on the vehicle speed and to calculate a first tilt angle based on the calculated traveling acceleration and the longitudinal acceleration.

In addition, the tilt angle measuring device 100 may include a yaw rate input unit 160 configured to receive an input of a signal of the yaw rate sensor 16; a yaw rate magnitude determination unit 170 configured to determine when a magnitude of a signal of the yaw rate sensor 16 is equal to or greater than a predetermined value; a compensation value calculation unit 180 configured to calculate a compensation value for compensating a first tilt angle according to the yaw rate magnitude; and a compensation value coupling unit 190 configured to output a second tilt angle by combining the first tilt angle and the compensation value.

The units 120, 140, 150, 160, 170, 180, and 190 that are included in the tilt angle measuring device 100 may be formed in a module form in which a program and hardware are combined. Each of the vehicle speed input unit 120, the longitudinal acceleration input unit 140, the yaw rate input unit 160, the first tilt angle calculation unit 150, and the compensation value coupling unit 190 may include a filter for removing noise in the signal.

Figure 4:
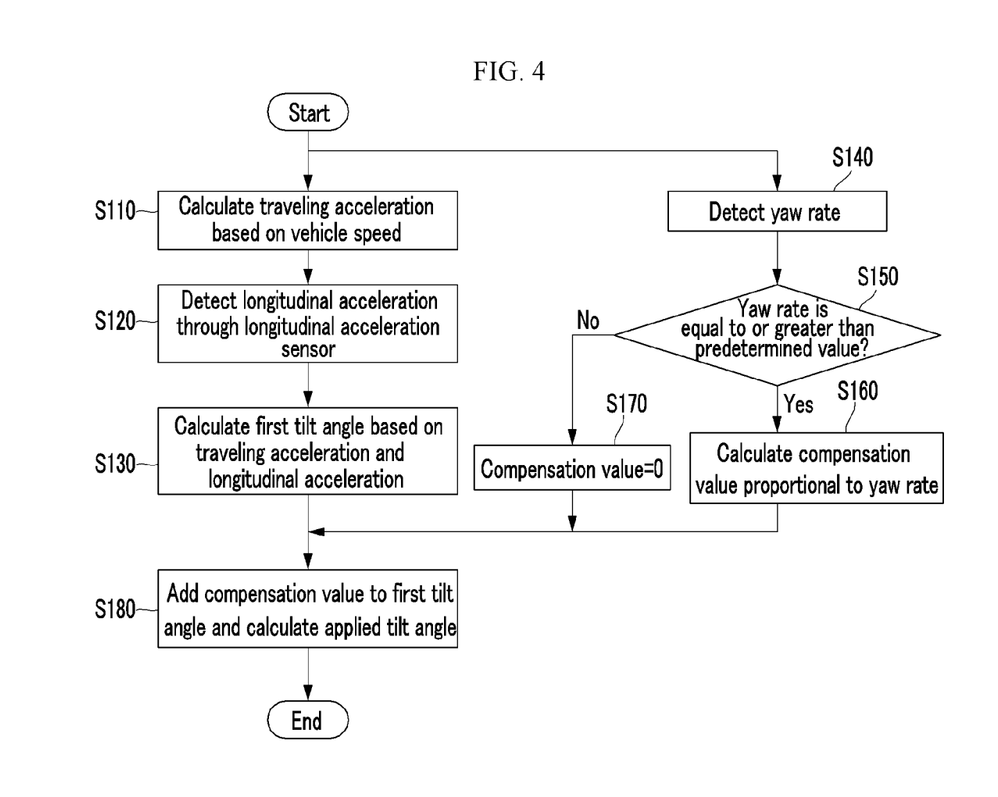
FIG. 4 is a flowchart illustrating a method of measuring a tilt angle according to an exemplary embodiment of the present invention.

Hereinafter, a method of measuring a tilt angle according to an exemplary embodiment of the present invention will be described in detail with reference to the accompanying drawings. FIG. 4 is an exemplary flowchart illustrating a method of measuring a tilt angle, according to an exemplary embodiment of the present invention.

As shown in FIG. 4, the tilt angle measuring device 100, controlled by the controller, may calculate a traveling acceleration based on a vehicle speed detected through the vehicle speed sensor 12 (S110). The traveling acceleration may be calculated by differentiating the vehicle speed by a predetermined time, as is well known to a person of a common skill in the art and thus a detailed description thereof will be omitted.

To calculate the traveling acceleration, a vehicle speed signal detected in the vehicle speed sensor 12 may be filtered in a vehicle speed input unit 120 and may be input to the first tilt angle calculation unit 150. When a vehicle speed signal that is filtered in the vehicle speed input unit 120 is input to the first tilt angle calculation unit 150, the first tilt angle calculation unit 150 may calculate the traveling acceleration by differentiating the filtered vehicle speed signal by a predetermined time.

Furthermore, the first tilt angle calculation unit 150 may receive an input of a longitudinal acceleration signal detected by the longitudinal acceleration sensor 14 (S120). The longitudinal acceleration signal detected by the longitudinal acceleration sensor 14 may be filtered in the longitudinal acceleration input unit 140 and may be input to the first tilt angle calculation unit 150. When the traveling acceleration is calculated and the longitudinal acceleration signal is input, the first tilt angle calculation unit 150 may calculate a first tilt angle (θ) by the following Equation 1, as described above, based on the traveling acceleration (a) and the longitudinal acceleration signal (long_accel_val) (S130).

Equation 1:

$$Ma = F - (F_{aerodynamic} + F_{Rolling} + F_{Climbing})$$
$$Ma = F - (F_{aerodynamic} + F_{Rolling} + Mg\sin\theta)$$
$$F - (F_{aerodynamic} + F_{Rolling}) = M \cdot (a + g\sin\theta)$$
$$\text{long\_accel\_val} = a + g\sin\theta$$
$$g\sin\theta = \text{long\_accel\_val} - a$$
$$\sin\theta \cong \theta = \frac{1}{g}(\text{long\_accel\_val} - a)$$
$$\therefore \theta = \frac{1}{g}(\text{long\_accel\_val} - a)$$

Wherein, M is a vehicle mass, a is a traveling acceleration of a vehicle, g is a gravity acceleration, F is an output of the vehicle, $F_{aerodynamic}$ is air resistance of the vehicle, $F_{rolling}$ is rolling resistance of the vehicle, and $F_{climbing}$ is tilt resistance of the vehicle.

The yaw rate input unit 160 of the tilt angle measuring device 100 may filter a yaw rate signal detected by the yaw rate sensor 16 and transfer the filtered yaw rate signal to the yaw rate magnitude determination unit 170 (S140). When a yaw rate signal filtered by the yaw rate input unit 160 is transferred to the yaw rate magnitude determination unit 170, the yaw rate magnitude determination unit 170 may determine when a value of the yaw rate signal is equal to or greater than a predetermined value (S150). The predetermined value may be set according to when a turn level of a vehicle is a level that may reduce a magnitude of a tilt angle by about 2-3% or more.

When a value of the yaw rate signal is equal to or greater than the predetermined value, the compensation value calculation unit 180 of the tilt angle measuring device 100 may calculate a compensation value proportional to the yaw rate (S160). In other words, the compensation value calculation unit 180 may calculate a compensation value that compensates a magnitude of a tilt angle reduced by a yaw rate and/or lateral acceleration occurring according to the turn of the vehicle. The compensation value may be calculated based on experimental data or an experiment measured value.

When a value of the yaw rate signal is less than the predetermined value, the compensation value calculation unit 180 of the tilt angle measuring device 100 may set a compensation value to 0 (S170).

When the compensation value is calculated, the compensation value coupling unit 180 of the tilt angle measuring device 100 may add the compensation value to the first tilt angle and output the added first tilt angle as the second tilt angle (S180).

Figure 5:
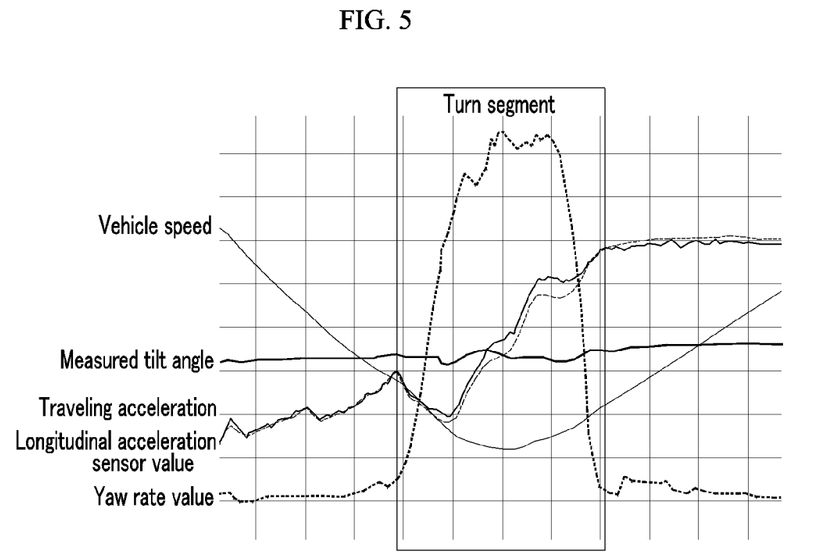
FIG. 5 is a tilt angle measuring graph according to an exemplary embodiment of the present invention.

FIG. 5 is an exemplary graph illustrating a compensated tilt angle during a turn of the vehicle, according to an exemplary embodiment of the present invention. Referring to FIG. 5, according to an exemplary embodiment of the present invention, while the vehicle is turning, a tilt angle may be compensated and the tilt angle may be accurately measured within an error range of about 2-3%, compared with a conventional case (see FIG. 2).

Thus, according to an exemplary embodiment of the present invention, when measuring a tilt angle of a traveling road, it may be estimated that a tilt angle is reduced through a signal value of a yaw rate sensor and by compensating a tilt angle calculated by a vehicle speed and a longitudinal acceleration signal, the tilt angle may be more accurately measured.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

What is claimed is:

1. A method of measuring a tilt angle of a traveling road, the method comprising:
   detecting, by a vehicle speed sensor, a vehicle speed;
   detecting, by a longitudinal acceleration sensor, a longitudinal acceleration of a vehicle;
   detecting, by a yaw rate sensor, a yaw rate of the vehicle;
   receiving, by a controller, an input of a signal of the vehicle speed sensor, the longitudinal acceleration sensor, and the yaw rate sensor;
   calculating, by the controller, a traveling acceleration based on the detected vehicle speed;
   calculating, by the controller, a first tilt angle of the traveling road based on the traveling acceleration and the longitudinal acceleration;
   determining, by the controller, when a value of the detected yaw rate is equal to or greater than a predetermined value; and
   calculating, by the controller, a second tilt angle to apply a compensation value set to the first tilt angle in response to detecting the yaw rate equal to or greater than a predetermined value to measure the tilt second angle while the vehicle is turning.

2. The method of claim 1, further comprising setting, by the controller, the first tilt angle as the second tilt angle when a value of the detected yaw rate is less than a predetermined value.

3. The method of claim 1, wherein the predetermined compensation value is set proportional to a value of the yaw rate.

4. The method of claim 3, wherein calculating the second tilt angle comprises adding, by the controller, the predetermined compensation value to the first tilt angle.

5. The method of claim 1, wherein the traveling acceleration is calculated, by the controller, by differentiating the travel speed by a predetermined time, and the first tilt angle is calculated based on subtracting, by the controller, the traveling acceleration from the longitudinal acceleration.

6. A system that measures a tilt angle of a traveling road, the system comprising:
   a vehicle speed sensor configured to detect a vehicle speed;
   a longitudinal acceleration sensor configured to detect longitudinal acceleration of a vehicle;
   a yaw rate sensor configured to detect a yaw rate of the vehicle; and
   a controller configured to:
      receive an input of a signal of the vehicle speed sensor, the longitudinal acceleration sensor, and the yaw rate sensor;
      calculate a traveling acceleration based on the detected vehicle speed;
      calculate a first tilt angle of the traveling road based on the traveling acceleration and the longitudinal acceleration;
      determine when a value of the detected yaw rate is equal to or greater than a predetermined value; and
      calculate a second tilt angle to apply a compensation value set to the first tilt angle in response to detecting the detected yaw rate equal to or greater than a predetermined value to measure the second tilt angle while the vehicle is turning.

7. The system of claim 6, wherein the controller is further configured to set the first tilt angle as the second tilt angle when a value of the detected yaw rate is less than a predetermined value.

8. The system of claim 6, wherein the predetermined compensation value is set proportional to a value of the yaw rate.

9. The system of claim 8, wherein the controller is further configured to add the predetermined compensation value to the first tilt angle.

10. The system of claim 6, wherein the controller is further configured to calculate the traveling acceleration by differentiating the travel speed by a predetermined time, and the first tilt angle by subtracting the traveling acceleration from the longitudinal acceleration.

11. A non-transitory computer readable medium containing program instructions executed by a processor or controller, the computer readable medium comprising:
   program instructions that control a vehicle speed sensor to detect a vehicle speed;
   program instructions that control a longitudinal acceleration sensor to detect a longitudinal acceleration of a vehicle;
   program instructions that control a yaw rate sensor detect a yaw rate of the vehicle;
   program instructions that receive an input of a signal of the vehicle speed sensor, the longitudinal acceleration sensor, and the yaw rate sensor;
   program instructions that calculate a traveling acceleration based on the detected vehicle speed;
   program instructions that calculate a first tilt angle of the traveling road based on the traveling acceleration and the longitudinal acceleration;
   program instructions that determine when a value of the detected yaw rate is equal to or greater than a predetermined value; and
   program instructions that calculate a second tilt angle to apply a compensation value set to the first tilt angle in response to detecting the detected yaw rate equal to or greater than a predetermined value to measure the second tilt angle while the vehicle is turning.

12. The computer readable medium of claim 11, further comprising:
   program instructions that set the first tilt angle as the second tilt angle when a value of the detected yaw rate is less than a predetermined value.

13. The computer readable medium of claim 11, wherein the predetermined compensation value is set proportional to a value of the yaw rate.

14. The computer readable medium of claim 13, further comprising:
   program instructions that calculate the second tilt angle by adding the predetermined compensation value to the first tilt angle.

15. The computer readable medium of claim 11, further comprising:
   program instructions that calculate the traveling acceleration by differentiating the travel speed by a predetermined time; and
   program instructions that calculate the first tilt angle by subtracting the traveling acceleration from the longitudinal acceleration.

\* \* \* \* \*